(12) United States Patent
Zhang et al.

(10) Patent No.: US 11,462,134 B2
(45) Date of Patent: Oct. 4, 2022

(54) FLEXIBLE DISPLAY DEVICE

(71) Applicant: Wuhan China Star Optoelectronics Semiconductor Display Technology Co., Ltd., Wuhan (CN)

(72) Inventors: Zhuo Zhang, Wuhan (CN); Fang Wang, Wuhan (CN); Wen Han, Wuhan (CN); Zikang Feng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/763,337

(22) PCT Filed: Dec. 23, 2019

(86) PCT No.: PCT/CN2019/127294
§ 371 (c)(1),
(2) Date: May 12, 2020

(87) PCT Pub. No.: WO2021/082234
PCT Pub. Date: May 6, 2021

(65) Prior Publication Data
US 2022/0254281 A1    Aug. 11, 2022

(30) Foreign Application Priority Data
Oct. 29, 2019   (CN) .......................... 201911038227.4

(51) Int. Cl.
*G09F 9/30*    (2006.01)

(52) U.S. Cl.
CPC .................................. *G09F 9/301* (2013.01)

(58) Field of Classification Search
CPC ................... G09F 9/301; G06F 1/1652; G06F 2203/04102
See application file for complete search history.

(56) References Cited

U.S. PATENT DOCUMENTS

| | | | |
|---|---|---|---|
| 6,498,597 B1 * | 12/2002 | Sawano | G09F 11/29 |
| | | | 345/905 |
| 9,817,443 B2 * | 11/2017 | Kim | G06F 1/1652 |
| 10,416,722 B2 * | 9/2019 | Cho | G06F 1/1656 |
| 11,100,818 B1 * | 8/2021 | Feng | G06F 1/1624 |

(Continued)

FOREIGN PATENT DOCUMENTS

| | | |
|---|---|---|
| CN | 201928318 U | 8/2011 |
| CN | 202281865 U | 6/2012 |

(Continued)

*Primary Examiner* — Joe H Cheng
(74) *Attorney, Agent, or Firm* — Nathan & Associates; Menachem Nathan

(57) ABSTRACT

A flexible display device is provided, which includes a flexible display assembly, a housing, a scrolling assembly, and an optical assembly. A storage cavity is formed inside the housing. At least one scrolling assembly is fixed to the housing. The flexible display assembly is disposed on the housing and an extension portion of the flexible display assembly extends into the storage cavity above the scrolling assembly. The housing includes a first housing and a second housing that can slide relatively. The at least one scrolling assembly includes at least a hollow shaft, and the optical assembly is nested in the hollow shaft.

18 Claims, 3 Drawing Sheets

(56) References Cited

U.S. PATENT DOCUMENTS

| | | | |
|---|---|---|---|
| 11,361,681 B2* | 6/2022 | Feng | G06F 1/1624 |
| 2005/0041012 A1* | 2/2005 | Daniel | G09F 9/301 |
| | | | 345/156 |
| 2008/0049003 A1* | 2/2008 | Hasegawa | G06F 1/1637 |
| | | | 345/206 |
| 2013/0127799 A1 | 5/2013 | Lee | |
| 2014/0380186 A1* | 12/2014 | Kim | G06F 1/1677 |
| | | | 715/746 |
| 2016/0034000 A1* | 2/2016 | Lee | G06F 1/1652 |
| | | | 361/749 |
| 2016/0100478 A1 | 4/2016 | Lee | |
| 2017/0060183 A1* | 3/2017 | Zhang | G06F 1/1615 |
| 2018/0077808 A1* | 3/2018 | Seo | G06F 3/044 |
| 2018/0103550 A1 | 4/2018 | Seo et al. | |
| 2019/0297736 A1 | 9/2019 | Xu et al. | |
| 2022/0130287 A1* | 4/2022 | Feng | H01L 27/3241 |

FOREIGN PATENT DOCUMENTS

| | | |
|---|---|---|
| CN | 204679711 U | 9/2015 |
| CN | 105489628 A | 4/2016 |
| CN | 105979037 A | 9/2016 |
| CN | 106448465 A | 2/2017 |
| CN | 107919065 A | 4/2018 |
| CN | 108230937 A | 6/2018 |
| CN | 110010007 A | 7/2019 |
| CN | 110033707 A | 7/2019 |
| CN | 110047385 A | 7/2019 |
| CN | 110246422 A | 9/2019 |
| CN | 110599911 A | 12/2019 |
| JP | 2010078666 A | 4/2010 |

\* cited by examiner

FLEXIBLE DISPLAY DEVICE

CROSS REFERENCE TO RELATED APPLICATIONS

This application is a national stage under 35 U.S.C. 371 of PCT/CN2019/127294, filed on Dec. 23, 2019, which claims priority under 35 U.S.C. 119 of Chinese Patent Application No. 201911038227.4, filed on Oct. 29, 2019, the disclosure of which is incorporated by reference in its entirety.

FIELD OF INVENTION

The present application relates to the field of display technologies, and in particular, to a flexible display device.

BACKGROUND OF INVENTION

Flexible display devices are more resistant to bending and are light weight, and display devices equipped with flexible organic light-emitting diode (OLED) display devices are becoming more and more popular in the market. The display devices usually include a variety of assemblies and components carried within or on a protective housing. Each of the assemblies and each of the components perform their respective functions, but the numerous assemblies and components often make the display devices thicker and heavier overall, and are not conducive to lightweight and thin designs. In addition, current display devices often have a single function, making their scope of usage limited.

Therefore, the current technology has defects and urgently needs improvement.

SUMMARY OF INVENTION

Technical Problem

The present application provides a flexible display device capable of solving problems of heavy weight and single function of current display devices.

Technical Solutions

To solve the above problems, the technical solutions provided in the present application are as follows.

The present application provides a flexible display device including a flexible display assembly, a housing, at least one scrolling assembly, and an optical assembly;

wherein a storage cavity is formed inside the housing, the housing is provided with at least one opening penetrating the storage cavity, the at least one scrolling assembly is fixed to the housing;

wherein an outer surface of the housing includes a support surface, the flexible display assembly is disposed on the support surface, an extension portion of the flexible display assembly extends into the storage cavity through the at least one opening; and wherein the housing includes a first housing and a second housing opposite to each other, the first housing and the second housing are configured to slide relative to each other in a first direction to increase or decrease an area of the support surface, and are configured to pull out or accommodate the extension portion through the at least one scrolling assembly;

wherein the at least one scrolling assembly is disposed in an axial direction parallel to the support surface and perpendicular to the first direction, the at least one scrolling assembly includes at least a hollow shaft, and the optical assembly is embedded in the hollow shaft.

In the flexible display device of the present application, the housing is provided with apertures at positions corresponding to both ends of the hollow shaft, the hollow shaft is connected to the housing, and a diameter of each of the apertures is less than or equal to an outer diameter of the hollow shaft.

In the flexible display device of the present application, the optical assembly includes one or more combinations of a convex lens, a concave lens, an optical prism, and an optical film, and distributed at intervals along an axial direction of the hollow shaft.

In the flexible display device of the present application, diameters of the convex lens, the concave lens, the optical prism, and the optical film are all less than or equal to an inner diameter of the hollow shaft.

In the flexible display device of the present application, an objective lens is the convex lens, an eyepiece is the concave lens, and the optical prism is disposed between the convex lens and the concave lens; alternatively, both the objective lens and the eyepiece are the convex lenses, and the optical prism is disposed between the two convex lenses.

In the flexible display device of the present application, the at least one scrolling assembly is disposed in the storage cavity, and is configured to enroll or spread the extension portion.

In the flexible display device of the present application, the at least one scrolling assembly is fixed to the first housing, and a first end of the flexible display assembly is connected to the at least one scrolling assembly; alternatively, the at least one scrolling assembly is fixed to the second housing, and a second end of the flexible display assembly is connected to the at least one scrolling assembly.

In the flexible display device of the present application, the at least one scrolling assembly is disposed on the first housing, an another scrolling assembly is disposed on the second housing, a first end of the flexible display assembly is connected to the at least one scrolling assembly, and a second end of the flexible display assembly is connected to the another the scrolling assembly.

In the flexible display device of the present application, each the scrolling assembly includes a coil spring and the hollow shaft, the hollow shaft and the first housing and/or the second housing are rotationally connected, a first end of the coil spring is fixedly connected to the hollow shaft, and a second end of the coil spring is fixedly connected to the flexible display assembly.

In the flexible display device of the present application, a focusing device is disposed on the first housing and/or the second housing, and the focusing device is configured to adjust a focal length of the optical assembly.

In the flexible display device of the present application, the optical assembly includes an eyepiece and an objective lens, and the focusing device is configured to move the eyepiece in the axial direction of the hollow shaft relative to the objective lens.

In the flexible display device of the present application, the at least one scrolling assembly is disposed at an end of the first housing, an another scrolling assembly is disposed at an opposite end of the first housing, the at least one opening is formed between the first housing and the second housing, a first end of the flexible display assembly is fixedly connected to the second housing positioning at a side of the at least one opening, the flexible display assembly passes through the support surface and the scrolling assembly and extends from an opposite side of the at least one opening into the storage cavity, and a second end of the flexible display assembly is fixedly connected to an end of the second housing close to the first housing.

In the flexible display device of the present application, each the scrolling assembly includes the hollow shaft, the hollow shaft is rotatably connected to the first housing, and the flexible display assembly is configured to pull out or accommodate the extension portion through the rotation of the hollow shaft when the first housing and the second housing are relatively slid in the first direction.

In the flexible display device of the present application, the first housing includes a first housing body and a first sliding portion fixedly connected to the first housing body, the second housing includes a second housing body and a second sliding portion fixedly connected to the second housing body; the first housing body is disposed opposite to the second housing body, the first sliding portion and the second sliding portion are slidably connected to each other in the first direction, and a support surface formed by an outer surface of the first sliding portion and an outer surface of the second sliding portion is on a same plane of the outer surface of the first sliding portion and the outer surface of the second sliding portion.

In the flexible display device of the present application, the first sliding portion and the second sliding portion are both comb-shaped and engaged with each other.

Beneficial Effect

The beneficial effect of the present application is that the flexible display device provided by the present application reduces an overall weight of the display device by a hollow processing of a solid shaft in the scrolling assembly for accommodating the flexible display assembly in the flexible display device. Without affecting display of the display device, an optical assembly is arranged in a processed hollow shaft. Through different combinations of different lenses in the optical assembly, the display device has different functions such as telescope, magnifying glass, and microscope, etc., thereby realizing diversification of the functions of the display device, making the display device suitable for various environments.

BRIEF DESCRIPTION OF FIGURES

In order to illustrate the technical solutions of the present embodiment or the related art in a clearer manner, the drawings desired for the present embodiment or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF EMBODIMENTS

Figure 1:
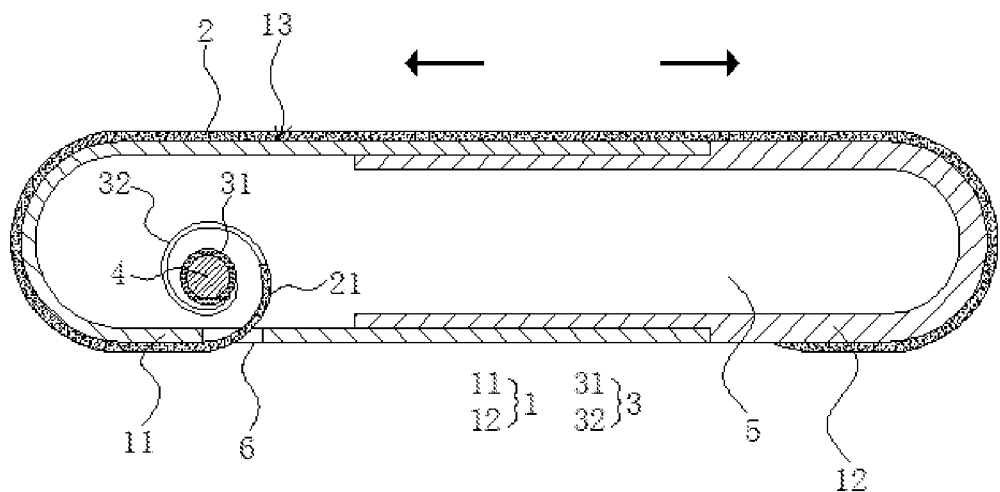
FIG. 1 is a schematic cross-sectional view of a flexible display device according to a first embodiment of the present application.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

The present application addresses the technical problems of heavy weight and single function of the current display devices. The following embodiments can solve these defects.

Figure 2:
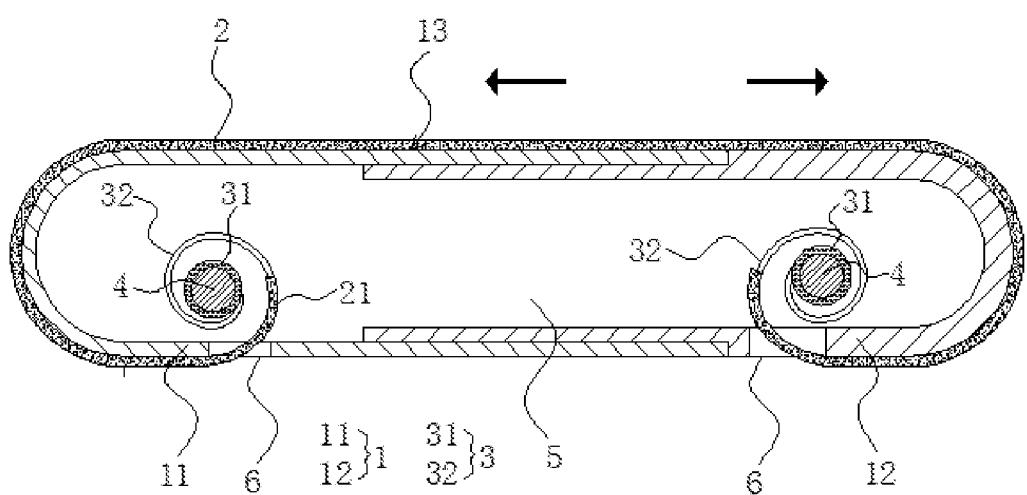
FIG. 2 is a schematic cross-sectional view of the flexible display device according to a second embodiment of the present application.
Figure 3:
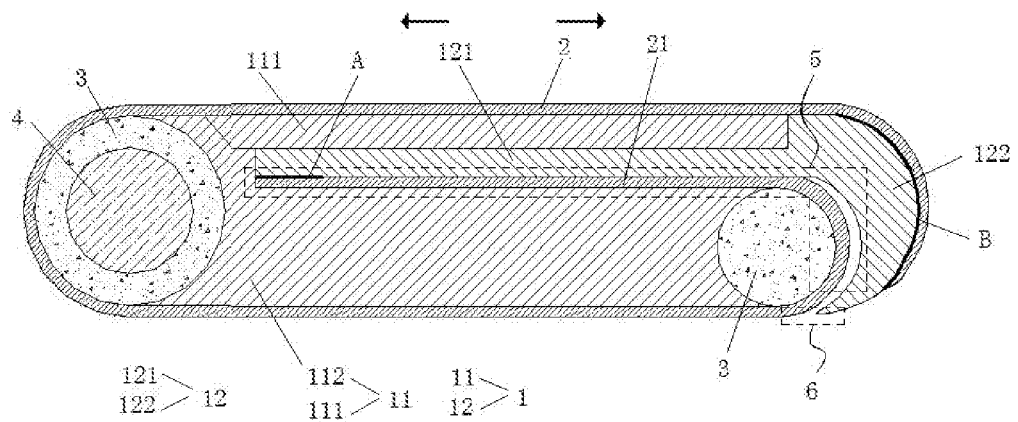
FIG. 3 is a schematic cross-sectional view of the flexible display device according to a third embodiment of the present application.

Please refer to FIG. 1 to FIG. 3, where a flexible display device according to the present application includes a housing 1, a flexible display assembly 2, at least one scrolling assembly 3, and an optical assembly 4, wherein a storage cavity 5 is formed inside the housing 1, the housing 1 is provided with at least one opening 6 penetrating the storage cavity 5, and each of the scrolling assembly 3 is fixed to the housing 1.

An outer surface of the housing 1 includes a support surface 13, the flexible display assembly 2 is disposed on the support surface 13, and an extension portion 21 of the flexible display assembly 2 extends into the storage cavity 5 through the at least one opening 6.

The housing 1 includes a first housing 11 and a second housing 12 opposite to each other, the first housing 11 and the second housing 12 are configured to slide relative to each other in a first direction to increase or decrease an area of the support surface 13, and are configured to pull out or accommodate the extension portion 21 through the scrolling assembly 3.

The scrolling assembly 3 is disposed in an axial direction parallel to the support surface 13 and perpendicular to the first direction, the scrolling assembly 3 includes at least a hollow shaft 31, and the optical assembly 4 is embedded in the hollow shaft 31.

The optical assembly 4 includes one or more combinations of a convex lens, a concave lens, an optical prism, and an optical film, distributed at intervals along an axial direction of the hollow shaft 31. In addition, diameters of the convex lens, the concave lens, the optical prism, and the optical film are all less than or equal to an inner diameter of the hollow shaft 31.

The housing 1 is provided with apertures at positions corresponding to both ends of the hollow shaft 31, the hollow shaft 31 is connected to the housing 1, and a diameter of each of the apertures is less than or equal to an outer diameter of the hollow shaft 31.

The present application reduces an overall weight of the display device by a hollow processing of a solid shaft in the scrolling assembly for accommodating the flexible display assembly in the flexible display device. Without affecting display of the display device, an optical assembly is arranged in a processed hollow shaft. Through different combinations of different lenses in the optical assembly, the display device has different functions such as telescope, magnifying glass, and microscope, etc., thereby realizing diversification of the functions of the display device, making the display device suitable for various environments.

The following describes the flexible display device provided in the present application in detail with specific embodiments.

First Embodiment

The flexible display device, as shown in FIG. 1, where the flexible display device includes the housing 1, the flexible display assembly 2, the scrolling assembly 3, and the optical assembly 4.

The housing 1 includes the first housing 11 and the second housing 12 opposite to each other. The housing 1 has the support surface 13 for supporting the flexible display assembly 2. The first housing 11 and the second housing 12 are configured to slide in the first direction to increase or decrease the area of the support surface 13. The first direction is a direction indicated by an arrow as shown in the figure.

Specifically, the first housing 11 and the second housing 12 are combined to form the storage cavity 5 disposed inside the housing 1, and the first housing 11 is provided with the opening 6.

The scrolling assembly 3 is disposed in the storage cavity 5, the scrolling assembly 3 is arranged in the axial direction parallel to the support surface 13 and perpendicular to the first direction, and the scrolling assembly 3 is fixed to the first housing 11.

The flexible display assembly 2 is disposed on the support surface 13, a first end of the flexible display assembly 2 is connected to the first housing 11, and a second end of the flexible display assembly 2 is connected to the second housing 12. The flexible display assembly 2 further includes the extension portion 21. The extension portion 21 is configured to extend or accommodate into the accommodating cavity 5, and is configured to compensate an amount of change in the area of the support surface 13 when the first housing 11 slides relatively to the second housing 12.

Specifically, the first end of the flexible display assembly 2 enters the storage cavity 5 through the opening 6 and is connected to the scrolling assembly 3, and the second end of the flexible display assembly 2 is fixed to an end of the second housing 12 away from the first housing 11.

The scrolling assembly 3 includes the hollow shaft 31 and a coil spring 32. Axes of the hollow shaft 31 and the coil spring 32 are parallel to the support surface 13 and perpendicular to the first direction. The coil spring 32 is sleeved on the hollow shaft 31, the hollow shaft 31 and the first housing 11 are rotationally connected, a first end of the coil spring 32 is fixedly connected to the hollow shaft 31, and a second end of the coil spring 32 is fixedly connected to the first end of the flexible display assembly 2.

When the first housing 11 and the second housing 12 slide relative to each other, the scrolling assembly 3 winds the flexible display assembly 2, or the scrolling assembly 3 expands a portion where the flexible display assembly 2 is wound. Specifically, when the first housing 11 and the second housing 12 are separated from each other in the first direction, the scrolling assembly 3 is configured to expand a portion where the flexible display assembly 2 is wound, and the area of the support surface 13 is increased. When the first housing 11 and the second housing 12 approach each other in the first direction, the scrolling assembly 3 is configured to accommodate the portion where the flexible display assembly 2 is wound, and the area of the support surface 13 is reduced. The coil spring 32 generates a pre-tension force on the flexible display assembly 2, so that the flexible display assembly 2 can be spread out on the support surface 13 at any time.

In another embodiment, the scrolling assembly 3 is fixed to the second housing 12, and the second housing 12 is provided with the opening 6. The first end of the flexible display assembly 2 is fixed to an end of the first housing 11 away from the second housing 12. The second end of the flexible display assembly 2 is connected to the scrolling assembly 3 through the opening 6.

Figure 5:
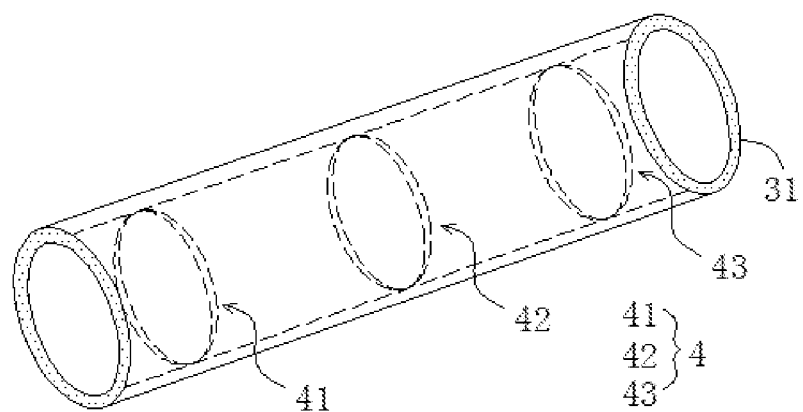
FIG. 5 is a schematic diagram of a combined structure of a hollow shaft and an optical assembly according to the present application.

As shown in combination with FIG. 5, the optical assembly 4 is nested in the hollow shaft 31. The optical assembly 4 includes a first lens 41, a second lens 42, and a third lens 43. The first lens 41 and the second lens 42 can be the convex lens; or one of the first lens 41 or the second lens 42 is the convex lens, and the other is the concave lens. The second lens 42 is the optical prism, and the second lens 42 is disposed between the first lens 41 and the third lens 43. One of the first lens 41 or the third lens 43 is an eyepiece, and the other is an objective lens. The hollow shaft 31 and the optical assembly 4 are combined to form a monocular.

In an embodiment, the hollow shaft 31 and the optical assembly 4 are combined to form a magnifying glass.

In an embodiment, the hollow shaft 31 and the optical assembly 4 are combined to form a microscope.

In the present embodiment, the flexible display device reduces an overall weight of the display device by a hollow processing of a solid shaft in the scrolling assembly. Moreover, an optical assembly is arranged in a processed hollow shaft. Through different combinations of different lenses in the optical assembly, the display device has different functions such as telescope, magnifying glass, and microscope, etc., thereby realizing diversification of the functions of the display device, making the display device suitable for various environments.

Second Embodiment

As shown in FIG. 2, a flexible display device of the present embodiment is same or similar to the flexible display device of the first embodiment, with the difference being that two scrolling assemblies 3 are provided in the present embodiment. One of the scrolling assemblies 3 is disposed on the first housing 11, and the other of the scrolling assemblies 3 is disposed on the second housing 12. The first end of the flexible display assembly 2 is connected to the scrolling assembly 3 on the first housing 11, and the second end of the flexible display assembly 2 is connected to the scrolling assembly 3 on the second housing 12.

Furthermore, the first housing 11 and the second housing 12 are provided with the openings 6. The flexible display assembly 2 is disposed on the support surface 13, and the first end and the second end of the flexible display assembly 2 respectively enter the storage cavity 5 through the openings 6 on the first housing 11 and the second housing 12.

Each of the two scrolling assemblies 3 includes the hollow shaft 31 and the coil spring 32, the apertures of the two hollow shafts 31 are same, and the optical assembly 4 is provided inside the two scrolling assemblies. In addition, the hollow shaft 31 and the optical assembly 4 are combined to form a binocular.

Figure 6:
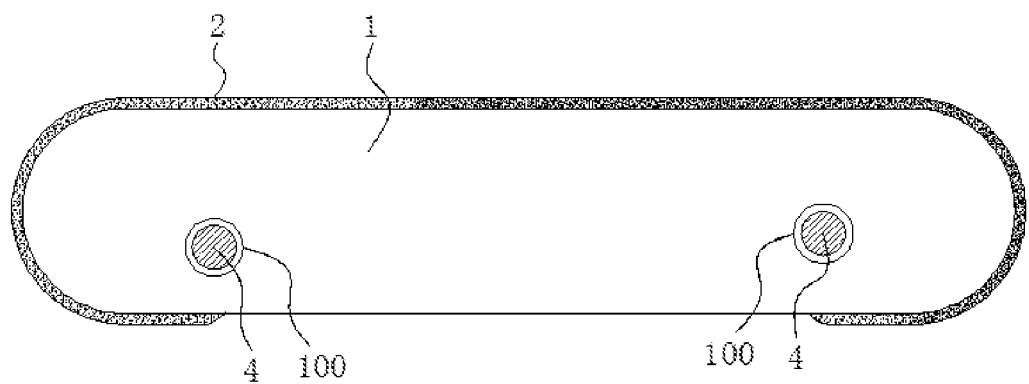
FIG. 6 is a schematic front view of the flexible display device according to the second embodiment of the present application.

As shown in combination with FIG. 6, the housing 1 is provided with the apertures (not shown) at positions corresponding to both ends of the hollow shaft 31, the hollow shaft 31 is connected to the housing 1, and the diameter of each of the apertures is less than or equal to the outer diameter of the hollow shaft 31. Therefore, an effective connection between the hollow shaft 31 and the housing 1 is ensured, and components inside the flexible display device disposed on the periphery of the hollow shaft 31 are prevented from entering an observer's vision and affecting user experience.

A focusing device 100 is disposed on the first housing and the second housing 12, and the focusing device 100 is configured to adjust a focal length of the optical assembly 4.

Specifically, the optical assembly 4 includes the eyepiece and the objective lens. The focusing device 100 can rotate the hollow shaft 31 at a certain angle by rotating, and the eyepiece follows a rotation of the hollow shaft 31 to move in the axial direction of the hollow shaft 31. That is, the focusing device 100 is configured to move the eyepiece in the axial direction of the hollow shaft 31 relative to the objective lens, thereby achieving focus.

The focusing device 100 in the present embodiment is also applicable to the first embodiment described above, and will not be repeated here.

As shown in combination with FIG. 5, the optical assembly 4 is nested in the hollow shaft 31. The optical assembly 4 includes the first lens 41, the second lens 42, and the third lens 43. Both the first lens 41 and the second lens 42 can be the convex lens; or one of the first lens 41 or the second lens 42 is the convex lens, and the other is the concave lens. The second lens 42 is the optical prism, and the second lens 42 is disposed between the first lens 41 and the third lens 43. One of the first lens 41 and the third lens 43 is an eyepiece, and the other is an objective lens. The hollow shaft 31 and the optical assembly 4 are combined to form a binocular focusable telescope.

In an embodiment, the hollow shaft 31 and the optical assembly 4 are combined to form a magnifying glass.

In an embodiment, the hollow shaft 31 and the optical assembly 4 are combined to form a microscope.

In the present embodiment, the flexible display device reduces an overall weight of the display device by a hollow processing of a solid shaft in the scrolling assembly. Moreover, an optical assembly is arranged in a processed hollow shaft. Through different combinations of different lenses in the optical assembly, the display device has different functions such as telescope, magnifying glass, and microscope, etc., thereby realizing diversification of the functions of the display device, making the display device suitable for various environments.

Third Embodiment

As shown in FIG. 3, the present embodiment provides a flexible display device, which includes a housing 1, a flexible display assembly 2, at least one scrolling assembly 3, and an optical assembly 4. The housing 1 includes the first housing 11 and the second housing 12 opposite to each other. The housing 1 has the support surface 13 for supporting the flexible display assembly 2. The first housing 11 and the second housing 12 are configured to slide in the first direction to increase or decrease the area of the support surface 13. The first direction is a direction indicated by an arrow as shown in the figure.

Specifically, the first housing 11 and the second housing 12 are combined to form the storage cavity 5 disposed inside the housing 1, and an opening 6 is formed between the first housing 11 and the second housing 12.

The at least one scrolling assembly 3 is disposed at an end of the first housing 11, and another scrolling assembly 3 is disposed at an opposite end of the first housing 11. A first end of the flexible display assembly 2 is fixedly connected to the second housing 12 positioning at a side of the opening 6 through a fitting position B. The flexible display assembly 2 passes through the support surface 13 and the scrolling assembly 3 and extends from an opposite side of the opening 6 into the storage cavity 5, and a second end of the flexible display assembly 2 is fixedly connected to an end of the second housing 12 close to the first housing 11 through a fitting position A.

Specifically, the flexible display assembly 2 includes an extension portion 21. The flexible display assembly 2 is configured to pull out the extension portion 21 through the rotation of the scrolling assembly 3 when the first housing 11 and the second housing 12 are relatively slid away from each other in the first direction. The flexible display assembly 2 is configured to accommodate the extension portion 21 through the rotation of the scrolling assembly 3 when the first housing 11 and the second housing 12 are relatively slid close to each other in the first direction.

At least one of the scrolling assemblies 3 is a hollow shaft, and the hollow shaft is rotatably connected to the first housing 11.

As shown in combination with FIG. 5, the optical assembly 4 is nested in the hollow shaft 31. The optical assembly 4 includes the first lens 41, the second lens 42, and the third lens 43. Both the first lens 41 and the second lens 42 can be the convex lens; or one of the first lens 41 or the second lens 42 is the convex lens, and the other is the concave lens. The second lens 42 is the optical prism, and the second lens 42 is disposed between the first lens 41 and the third lens 43. One of the first lens 41 and the third lens 43 is an eyepiece, and the other is an objective lens. The hollow shaft 31 and the optical assembly 4 are combined to form a monocular.

In an embodiment, the hollow shaft 31 and the optical assembly 4 are combined to form a magnifying glass.

In an embodiment, the hollow shaft 31 and the optical assembly 4 are combined to form a microscope.

In the present embodiment, the flexible display device reduces an overall weight of the display device by a hollow processing of a solid shaft in the scrolling assembly. Moreover, an optical assembly is arranged in a processed hollow shaft. Through different combinations of different lenses in the optical assembly, the display device has different functions such as telescope, magnifying glass, and microscope, etc., thereby realizing diversification of the functions of the display device, making the display device suitable for various environments.

Figure 4:
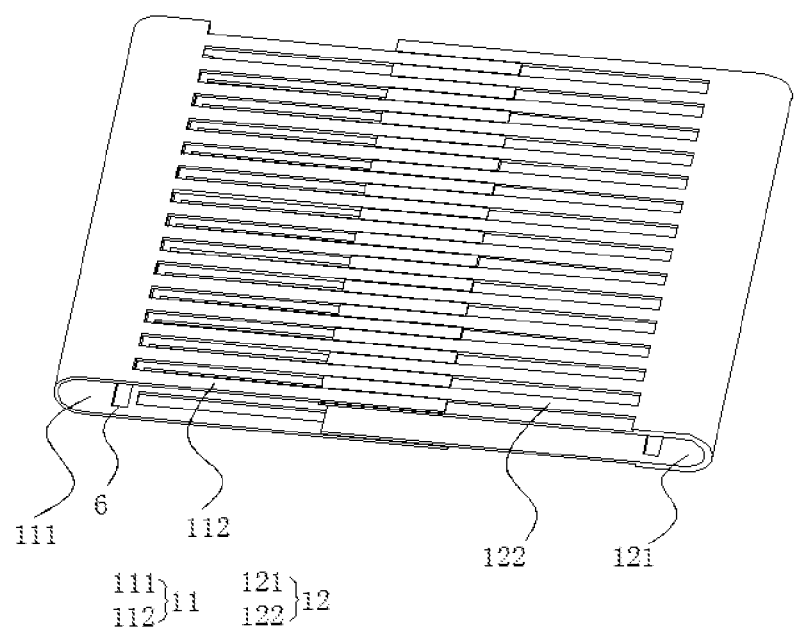
FIG. 4 is a schematic structural diagram of a housing of the flexible display device according to the first embodiment and the second embodiment of the present application.

With reference to the first embodiment, the second embodiment, and the third embodiment, and also referring to FIG. 3 and FIG. 4, the first housing 11 includes a first housing body 111 and a first sliding portion 112 fixedly connected to the first housing body 111, and the second housing 12 includes a second housing body 121 and a second sliding portion 122 fixedly connected to the second housing body 121. The first housing body 111 is disposed opposite to the second housing body 121, the first sliding portion 112 and the second sliding portion 122 are slidably connected to each other in the first direction, and a support surface 13 formed by an outer surface of the first sliding portion 112 and an outer surface of the second sliding portion 122 is on a same plane of the outer surface of the first sliding portion and the outer surface of the second sliding portion.

Furthermore, the first sliding portion 112 and the second sliding portion 122 are both comb-shaped and engaged with each other.

Embodiments of the present application have been described, but not intending to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A flexible display device, comprising a flexible display assembly, a housing, at least one scrolling assembly, and an optical assembly;

wherein a storage cavity is formed inside the housing, the housing is provided with at least one opening penetrating the storage cavity, and the at least one scrolling assembly is fixed to the housing;

wherein an outer surface of the housing comprises a support surface, the flexible display assembly is disposed on the support surface, and an extension portion of the flexible display assembly extends into the storage cavity through the at least one opening; and wherein the housing comprises a first housing and a second housing opposite to each other, the first housing and the second housing are configured to slide relative to each other in a first direction to increase or decrease an area of the support surface, and are configured to pull out or accommodate the extension portion through the at least one scrolling assembly;

wherein the at least one scrolling assembly is disposed in an axial direction parallel to the support surface and perpendicular to the first direction, the at least one scrolling assembly comprises at least a hollow shaft, and the optical assembly is nested in the hollow shaft.

2. The flexible display device according to claim 1, wherein the housing is provided with apertures at positions corresponding to both ends of the hollow shaft, the hollow shaft is connected to the housing, and a diameter of each of the apertures is less than or equal to an outer diameter of the hollow shaft.

3. The flexible display device according to claim 1, wherein the optical assembly comprises one or more combinations of a convex lens, a concave lens, an optical prism, and an optical film, distributed at intervals along an axial direction of the hollow shaft.

4. The flexible display device according to claim 3, wherein diameters of the convex lens, the concave lens, the optical prism, and the optical film are all less than or equal to an inner diameter of the hollow shaft.

5. The flexible display device according to claim 3, wherein an objective lens is the convex lens, an eyepiece is the concave lens, and the optical prism is disposed between the convex lens and the concave lens;

alternatively, both the objective lens and the eyepiece are the convex lens, and the optical prism is disposed between the two convex lenses.

6. The flexible display device according to claim 3, wherein the at least one scrolling assembly is disposed in the storage cavity, and is configured to wind or expand the extension portion.

7. The flexible display device according to claim 6, wherein the at least one scrolling assembly is fixed to the first housing, and a first end of the flexible display assembly is connected to the at least one scrolling assembly;

alternatively, the at least one scrolling assembly is fixed to the second housing, and a second end of the flexible display assembly is connected to the at least one scrolling assembly.

8. The flexible display device according to claim 7, wherein each of the at least one scrolling assembly comprises a coil spring and the hollow shaft, the hollow shaft and the first housing and/or the second housing are rotationally connected, a first end of the coil spring is fixedly connected to the hollow shaft, and a second end of the coil spring is fixedly connected to the flexible display assembly.

9. The flexible display device according to claim 8, wherein a focusing device is disposed on the first housing and/or the second housing, and the focusing device is configured to adjust a focal length of the optical assembly.

10. The flexible display device according to claim 9, wherein the optical assembly comprises an eyepiece and an objective lens, and the focusing device is configured to move the eyepiece in the axial direction of the hollow shaft relative to the objective lens.

11. The flexible display device according to claim 6, wherein the at least one scrolling assembly is disposed on the first housing, another scrolling assembly is disposed on the second housing, a first end of the flexible display assembly is connected to the at least one scrolling assembly, and a second end of the flexible display assembly is connected to the other scrolling assembly.

12. The flexible display device according to claim 11, wherein each of the at least one scrolling assembly comprises a coil spring and the hollow shaft, the hollow shaft and the first housing and/or the second housing are rotationally connected, a first end of the coil spring is fixedly connected to the hollow shaft, and a second end of the coil spring is fixedly connected to the flexible display assembly.

13. The flexible display device according to claim 12, wherein a focusing device is disposed on the first housing and/or the second housing, and the focusing device is configured to adjust a focal length of the optical assembly.

14. The flexible display device according to claim 13, wherein the optical assembly comprises an eyepiece and an objective lens, and the focusing device is configured to move the eyepiece in the axial direction of the hollow shaft relative to the objective lens.

15. The flexible display device according to claim 3, wherein the at least one scrolling assembly is disposed at an end of the first housing, another scrolling assembly is disposed at an opposite end of the first housing, the at least one opening is formed between the first housing and the second housing, a first end of the flexible display assembly is fixedly connected to the second housing positioned at a side of the at least one opening, the flexible display assembly passes through the support surface and the at least one scrolling assembly and extends from an opposite side of the at least one opening into the storage cavity, and a second end of the flexible display assembly is fixedly connected to an end of the second housing close to the first housing.

16. The flexible display device according to claim 15, wherein each of the at least one scrolling assembly comprises the hollow shaft, the hollow shaft is rotatably connected to the first housing, and the flexible display assembly is configured to pull out or accommodate the extension portion through the rotation of the hollow shaft when the first housing and the second housing are relatively slid in the first direction.

17. The flexible display device according to claim 1, wherein the first housing comprises a first housing body and a first sliding portion fixedly connected to the first housing body, the second housing comprises a second housing body and a second sliding portion fixedly connected to the second housing body, the first housing body is disposed opposite to the second housing body, the first sliding portion and the second sliding portion are slidably connected to each other in the first direction, and the support surface formed by an outer surface of the first sliding portion and an outer surface of the second sliding portion is on a same plane of the outer surface of the first sliding portion and the outer surface of the second sliding portion.

18. The flexible display device according to claim 17, wherein the first sliding portion and the second sliding portion are both comb-shaped and engaged with each other.

* * * * *